US012578879B2

(12) United States Patent　　(10) Patent No.:　US 12,578,879 B2
Buchman et al.　　　　　　　　(45) Date of Patent:　　Mar. 17, 2026

(54) ENCRYPTION TECHNIQUE ROTATION USING INPUT/OUTPUT OPERATIONS

(71) Applicant: Dell Products L.P., Round Rock, TX (US)

(72) Inventors: Ophir Buchman, Raanana (IL); Tomer Shachar, Beer Sheva (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 18/596,952

(22) Filed: Mar. 6, 2024

(65) Prior Publication Data

US 2025/0284412 A1　　Sep. 11, 2025

(51) Int. Cl.
*H04L 29/06*　　　(2006.01)
*G06F 3/06*　　　(2006.01)
*H04L 9/08*　　　(2006.01)

(52) U.S. Cl.
CPC ............ G06F 3/0623 (2013.01); G06F 3/061 (2013.01); G06F 3/0655 (2013.01); G06F 3/0679 (2013.01); H04L 9/088 (2013.01); H04L 9/0891 (2013.01)

(58) Field of Classification Search
CPC ...... G06F 3/0623; G06F 3/061; G06F 3/0655; G06F 3/0679; H04L 9/088; H04L 9/0891
See application file for complete search history.

(56) References Cited

U.S. PATENT DOCUMENTS

2011/0191594 A1*　8/2011　Bartlett ............... G06F 11/2056
　　　　　　　　　　　　　　　　　　　713/189
2015/0033037 A1*　1/2015　Lidman ................... G06F 21/78
　　　　　　　　　　　　　　　　　　　713/193
2018/0046586 A1*　2/2018　Venkatesh ............... G06F 3/067
2019/0132133 A1*　5/2019　Druker ............... H04L 63/0442
　　　　　　　　　　　(Continued)

OTHER PUBLICATIONS

May, C.J.; "How to Become Great at API Key Rotation: Best Practices and Tips"; https://blog.gitguardian.com/api-key-rotation-best-practices/#:~:text=As%20a%20best%20practice%2C%20you,to%20rotate%20keys%20as%20well; downloaded on Feb. 27, 2024.
(Continued)

*Primary Examiner* — William A Corum, Jr.
(74) *Attorney, Agent, or Firm* — Ryan, Mason & Lewis, LLP

(57)　　　　ABSTRACT
Techniques are provided for encryption technique rotation using input/output (I/O) operations. One method comprises obtaining an I/O request to write designated data to a storage device, wherein at least some of the existing data stored by the storage device prior to the obtaining is protected using a first encryption technique associated with a first time period; protecting the designated data using a second encryption technique associated with a second time period that is subsequent to the first time period; and writing the protected designated data to a sector of the at least one storage device. The sector may be marked as comprising re-encrypted data. For an I/O request to read data, a determination is made as to whether the requested read data is stored in a sector comprising re-encrypted data; and the requested read data is decrypted using a decryption key obtained based on a result of the determining.

20 Claims, 12 Drawing Sheets

(56) References Cited

U.S. PATENT DOCUMENTS

2023/0224154 A1 \*  7/2023  Gopalakrishna ...... H04L 9/0891
713/171

OTHER PUBLICATIONS

Shiftan, Ariel; "The Importance of Key Rotation for Data Security";
https://www.piiano.com/blog/key-rotation; dated May 23, 2023.
"Configure Cryptographic Key Auto-Rotation in Azure Key Vault";
https://learn.microsoft.com/en-us/azure/key-vault/keys/how-to-
configure-key-rotation; dated Jul. 6, 2023.

\* cited by examiner

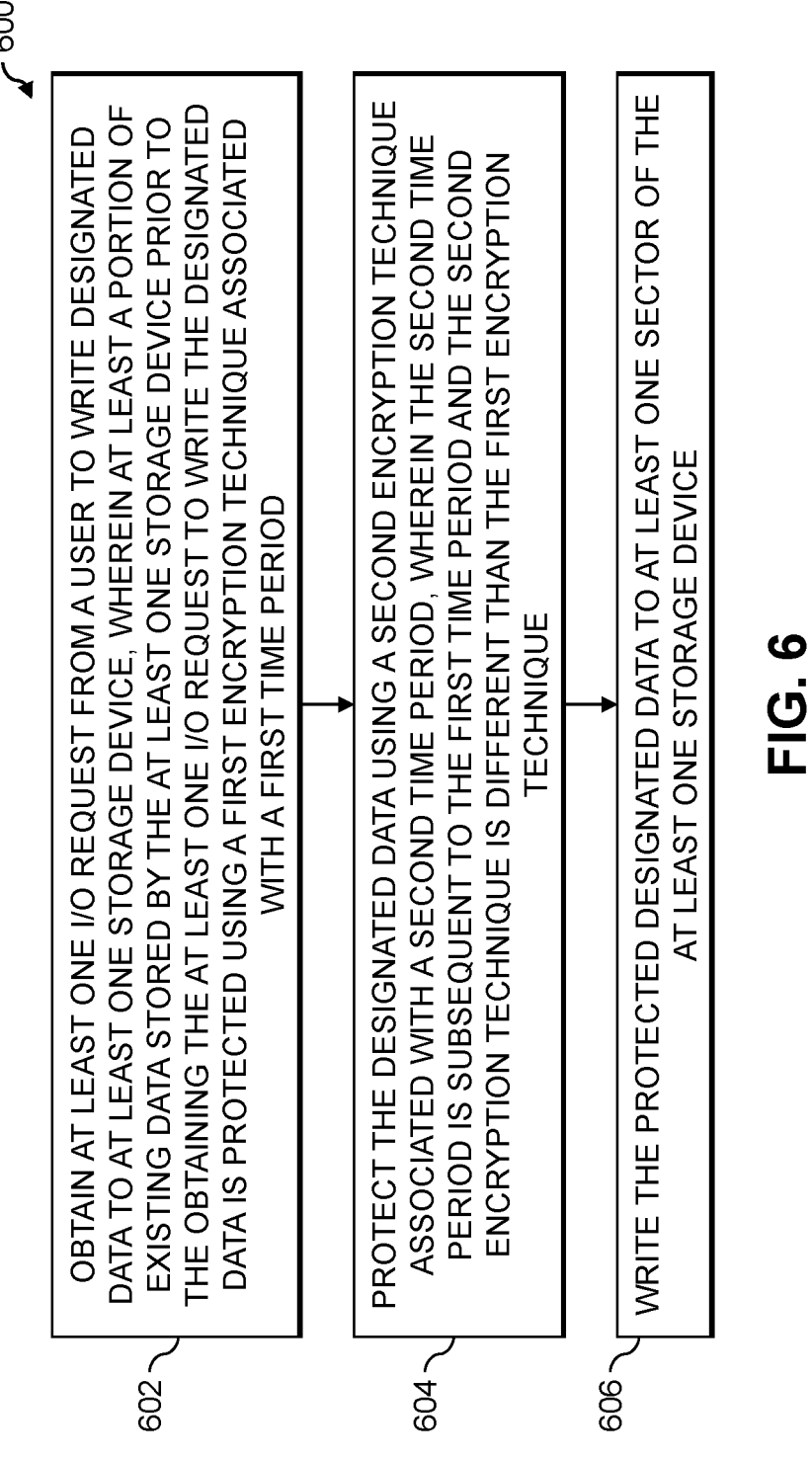

600

602 — OBTAIN AT LEAST ONE I/O REQUEST FROM A USER TO WRITE DESIGNATED DATA TO AT LEAST ONE STORAGE DEVICE, WHEREIN AT LEAST A PORTION OF EXISTING DATA STORED BY THE AT LEAST ONE STORAGE DEVICE PRIOR TO THE OBTAINING THE AT LEAST ONE I/O REQUEST TO WRITE THE DESIGNATED DATA IS PROTECTED USING A FIRST ENCRYPTION TECHNIQUE ASSOCIATED WITH A FIRST TIME PERIOD

604 — PROTECT THE DESIGNATED DATA USING A SECOND ENCRYPTION TECHNIQUE ASSOCIATED WITH A SECOND TIME PERIOD, WHEREIN THE SECOND TIME PERIOD IS SUBSEQUENT TO THE FIRST TIME PERIOD AND THE SECOND ENCRYPTION TECHNIQUE IS DIFFERENT THAN THE FIRST ENCRYPTION TECHNIQUE

606 — WRITE THE PROTECTED DESIGNATED DATA TO AT LEAST ONE SECTOR OF THE AT LEAST ONE STORAGE DEVICE

FIG. 6

ENCRYPTION TECHNIQUE ROTATION USING INPUT/OUTPUT OPERATIONS

BACKGROUND

Data protection techniques are often employed to secure information. Data is often encrypted using an encryption key, for example, to ensure that the encrypted data may only be accessed using an appropriate decryption key. Such encryption and decryption keys often need to be managed by an organization.

SUMMARY

Illustrative embodiments of the disclosure provide functionality for rotating encryption techniques using input/output (I/O) operations. An exemplary method comprises obtaining at least one I/O request from a user to write designated data to at least one storage device, wherein at least a portion of existing data stored by the at least one storage device prior to the obtaining the at least one I/O request to write the designated data is protected using a first encryption technique associated with a first time period; protecting the designated data using a second encryption technique associated with a second time period, wherein the second time period is subsequent to the first time period and the second encryption technique is different than the first encryption technique; and writing the protected designated data to at least one sector of the at least one storage device.

Illustrative embodiments can provide significant advantages relative to conventional encryption key replacement techniques. For example, problems associated with existing encryption key replacement techniques are overcome in one or more embodiments by utilizing I/O operations to perform the encryption key rotation.

These and other illustrative embodiments include, without limitation, methods, apparatus, networks, systems and processor-readable storage media.

BRIEF DESCRIPTION OF THE DRAWINGS

FIG. 6 is a flow diagram illustrating an exemplary implementation of a process for encryption technique rotation using I/O operations in an illustrative embodiment.

DETAILED DESCRIPTION

Figure 1:
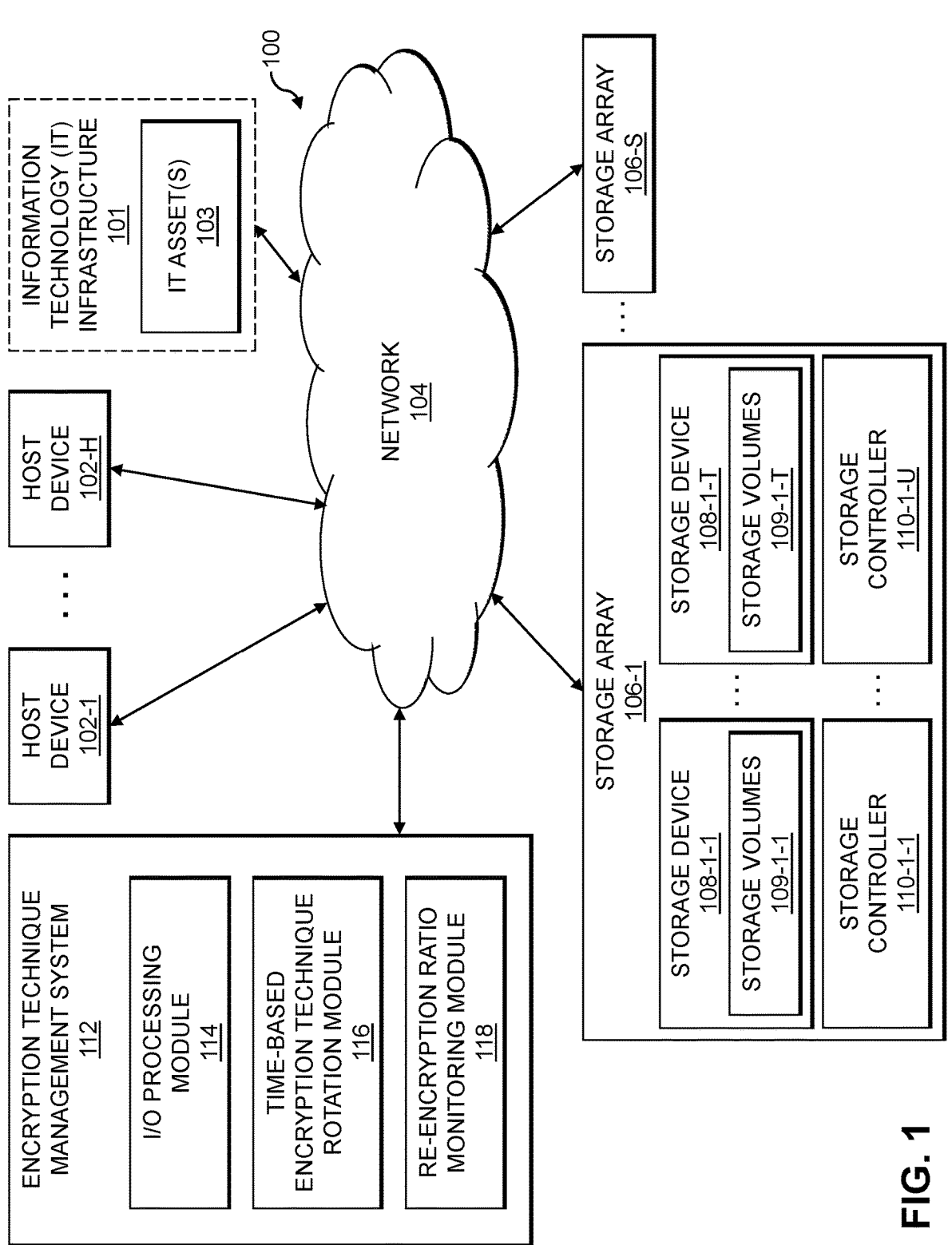
FIG. 1 is a block diagram of an information processing system configured for encryption technique rotation using I/O operations in an illustrative embodiment.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

A key rotation process (sometimes referred to as re-encryption) typically replaces an encryption key with another key that performs the same function as the original encryption key. There are several reasons for changing an encryption key, such as the encryption key being compromised, a cryptoperiod (e.g., a time period during which a given encryption key is valid) of the encryption key nearing expiration, and/or an amount of data protected with any given encryption key exceeding a threshold. The cryptoperiod may vary by organization, with some organizations employing a cryptoperiod of 90 days or less. A key rotation process may comprise reading data previously encrypted using a prior encryption key, decrypting the encrypted data using a decryption key corresponding to the prior encryption key and overwriting the data with data encrypted using a new encryption key. The key rotation process thus uses a significant amount of I/O and processing resources. Thus, the key rotation process may impair application availability (e.g., organizations may schedule the key rotation process during off peak hours, with the application remaining online but providing a slow user experience) or introduce a maintenance window in which one or more applications are taken offline. In addition, the full overwrite of the storage device associated with the key rotation process will increase the wear level of the storage device and reduce an overall lifetime of the storage device.

In one or more embodiments, functionality is provided for encryption technique rotation that leverages user I/O operations. As used herein, the term "encryption technique rotation" shall be broadly construed to encompass a replacement or rotation of an encryption key and/or an encryption algorithm. For example, an encryption technique associated with a first time period may employ a first encryption key and/or a first encryption algorithm and an encryption technique associated with a second time period may employ a second encryption key and/or a second encryption algorithm.

Among other benefits, the disclosed functionality for encryption technique rotation using I/O operations consumes fewer resources, introduces a reduced (e.g., minimal) effect on application performance and/or results in a reduced wear level of the storage device.

In some embodiments of the disclosure, a user defines how often the encryption technique rotation is performed. The disclosed functionality for encryption technique rotation breaks the user-defined time period into a number of different time periods, such as a first time period (sometimes referred to as a "green time period") comprising a first 80% (for example) of the original user-defined time period, a second time period (sometimes referred to as a "yellow time period") comprising a next 15% (for example) of the original time period and a third time period (sometimes referred to as a "red time period") comprising a last 5% (for example) of the original time period.

A new cryptographic key is created and stored when the encryption technique rotation process is initiated. All current storage device sectors can initially be marked as "not re-encrypted." In at least some embodiments, during the first time period, the storage device leverages existing write requests to encrypt data, as discussed further below in conjunction with FIGS. 2A and 2B. During the second time period, the storage device also leverages existing read requests to encrypt data, as discussed further below in conjunction with FIGS. 3A and 3B. During the third time period, the storage device actively encrypts any remaining non-re-encrypted sectors, as discussed further below in conjunction with FIGS. 4A, 4B and 4C. The encryption technique rotation process restarts at the conclusion of the third time period.

FIG. 1 is a block diagram of an information processing system 100 configured for encryption technique rotation using I/O operations in an illustrative embodiment. The information processing system 100 comprises one or more host devices 102-1, . . . 102-H (collectively, host devices 102) that communicate over a network 104 with an encryption technique management system 112.

One or more storage arrays 106-1, . . . 106-S (collectively, storage arrays 106) are also coupled to the network 104. The storage array 106-1, for example, comprises a plurality of storage devices 108-1-1, . . . 108-1-T (collectively, storage devices 108) and a plurality of storage controllers 110-1-1, . . . 110-1-U (collectively, storage controllers 110). The storage devices 108 store storage volumes 109-1-1, . . . 109-1-T (collectively, storage volumes 109). The storage volumes 109 illustratively comprise respective logical units (LUNs) or other types of logical storage volumes. The storage controllers 110 facilitate I/O processing in some embodiments for the storage devices 108. The storage array 106-1 and its associated storage devices 108 are an example of what is more generally referred to herein as a "storage system." This storage system in the present embodiment is shared by the host devices 102, and is therefore an example of a shared storage system. In embodiments where there is only a single host device 102, the host device 102 may be configured to have exclusive use of the storage system.

The storage controllers 110 of the storage arrays 106 should also be understood to include additional modules and other components typically found in conventional implementations of storage controllers and storage systems, although such additional modules and other components are omitted from the figure for clarity and simplicity of illustration. For example, in some embodiments, each of the storage controllers 110 has one or more local caches or allocated portions of a global cache associated therewith, although numerous alternative arrangements are possible. The storage controllers 110 can be implemented as respective storage processors, directors or other storage system components configured to control storage system operations relating to processing of I/O operations.

In some embodiments, the storage arrays 106 may represent respective storage nodes of a storage cluster that hosts virtual volumes for one or more virtual machines (VMs). The network 104, in some embodiments, may comprise a storage area network (SAN). Additional details of a virtualization environment that utilizes virtual volume storage are described below.

Each of the other storage arrays 106, such as storage array 106-S, is assumed to be configured to include storage devices 108, storage volumes 109 and storage controllers 110, in a manner similar to that illustrated for storage array 106-1 in FIG. 1.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Also coupled to the network 104 is an information technology (IT) infrastructure 101 comprising one or more IT assets 103. The IT assets 103 may comprise physical and/or virtual computing resources in the IT infrastructure 101. Physical computing resources may include physical hardware such as servers, host devices, storage systems, networking equipment, Internet of Things (IoT) devices, and other types of processing and computing devices including desktops, laptops, tablets, smartphones, etc. Virtual computing resources may include VMs, containers, etc.

The IT assets 103 of the IT infrastructure 101 may host applications that are utilized by respective one or more client devices, such as in accordance with a client-server computer program architecture. In some embodiments, the applications comprise web applications designed for delivery from assets in the IT infrastructure 101 to users (e.g., of client devices) over the network 104. Various other examples are possible, such as where one or more applications are used internal to the IT infrastructure 101 and not exposed to the client devices. It should be appreciated that, in some embodiments, some of the IT assets 103 of the IT infrastructure 101 may themselves be viewed as applications or more generally as software or hardware. For example, individual ones of the IT assets 103 that are virtual computing resources implemented as software containers may represent software. As another example, individual ones of the IT assets 103 that are physical computing resources may represent hardware devices.

The IT assets 103 in such an arrangement illustratively provide compute services such as execution of one or more applications on behalf of one or more users. Such applications illustratively generate I/O operations that are processed by a corresponding one of the storage arrays 106. The term "input-output" as used herein refers to at least one of input and output. For example, the term "I/O requests" shall be broadly construed to encompass write requests and/or read requests directed to logical addresses of a particular storage volume 109 of a given one of the storage arrays 106, as well as other types of I/O operations. These and other types of I/O operations are also generally referred to herein as I/O requests. References herein to terms such as "input-output" and "IO" should be understood to refer to input and/or output. Thus, an I/O operation relates to at least one of input and output.

The term "user" herein is intended to be broadly construed so as to encompass numerous arrangements of human, hardware, software or firmware entities, as well as combinations of such entities.

It should be apparent that the term "storage system" as used herein is intended to be broadly construed and may encompass multiple distinct instances of a commercially-available storage array. Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

Also, the term "storage device" as used herein is intended to be broadly construed, so as to encompass, for example, a logical storage device such as a LUN or other logical storage volume. A logical storage device can be defined in the storage devices 108 to include different portions of one or more physical storage devices. Storage devices 108 may therefore be viewed as comprising respective LUNs or other logical storage volumes.

The term "storage object" as used herein is intended to be broadly construed, so as to encompass, for example, storage devices 108 and/or storage volumes 109 (including virtual storage volumes), as would be apparent to a person of ordinary skill in the art.

The encryption technique management system 112 includes an I/O processing module 114, a time-based encryption technique rotation module 116 and a re-encryption ratio monitoring module 118. The I/O processing module 114 processes user I/O operations. The time-based encryption technique rotation module 116 implements the disclosed encryption technique rotation processes and transitions the disclosed encryption technique rotation processes between the functionality of the first time period, the second time period and the third time period.

The re-encryption ratio monitoring module 118, in at least some embodiments, is configured to monitor a re-encryption ratio of one or more storage devices, as discussed further below in conjunction with FIG. 5.

At least portions of the functionality of the I/O processing module 114, time-based encryption technique rotation module 116 and re-encryption ratio monitoring module 118 may be implemented at least in part in the form of software that is stored in memory and executed by a processor.

The encryption technique management system 112 (or portions thereof) may be part of one or more storage arrays 106 and/or of one or more host devices 102. Thus, although shown as external to the host devices 102 and storage arrays 106 in the FIG. 1 embodiment, it should be appreciated that the encryption technique management system 112 in other embodiments may be implemented at least in part internal to one or more of the host devices 102 and/or one or more of the storage arrays 106 (e.g., such as on the storage controllers 110 of storage array 106-1).

The host devices 102, storage arrays 106, and the encryption technique management system 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102, the storage arrays 106 and the encryption technique management system 112 may be implemented on respective distinct processing platforms, although numerous other arrangements are possible. For example, in some embodiments at least portions of one or more of the host devices 102, the storage arrays 106 and the encryption technique management system 112 are implemented on the same processing platform. The encryption technique management system 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement I/O operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1, in some embodiments, comprises a persistent memory that is implemented using a flash memory or other type of non-volatile memory of the storage array 106-1. More particular examples include NAND-based flash memory or other types of non-volatile memory such as resistive RAM, phase change memory, and spin torque transfer magneto-resistive RAM (STT-MRAM). The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100, such as the encryption technique management system 112, may in some embodiments be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. In some embodiments, the storage array 106-1 may be associated with a first storage tier and the storage array 106-S may be associated with a second, different storage tier. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As noted above, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays 106 arranged in an active-active configuration and/or an active-inactive configuration. For example, such an active-active configuration can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more VMs or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the encryption technique management system 112 may be implemented at least in part in the first geographic location, the second geographic location, and one or more other geographic locations. Thus, it is possible in some implementations of the system 100 for different ones of the host devices 102, the storage arrays 106 and the encryption technique management system 112 to reside in different data centers.

Numerous other distributed implementations of the host devices 102, the storage arrays 106 and the encryption technique management system 112 are possible. Accordingly, the host devices 102, the storage arrays 106 and the encryption technique management system 112 can also be implemented in a distributed manner across multiple data centers.

Additional examples of processing platforms utilized to implement portions of the system 100 in illustrative embodiments will be described in more detail below in conjunction with FIGS. 7 and 8.

It should be understood that the particular sets of modules and other components implemented in the system 100 as illustrated in FIG. 1 are presented by way of example only. In other embodiments, only subsets of these components, or additional or alternative sets of components, may be used, and such components may exhibit additional or alternative functionality and configurations.

It is to be appreciated that these and other features of illustrative embodiments are presented by way of example only, and should not be construed as limiting in any way.

As indicated previously, illustrative embodiments overcome various drawbacks of conventional practice by configuring the system 100 to include functionality for encryption technique rotation using I/O operations, as will be described in more detail.

In some data centers or other IT infrastructure that includes virtualized infrastructure (e.g., VDI environments including multiple VMs), SAN and NAS arrays may be virtualized. For example, a virtual volume (vVol) integration and management framework may be used to virtualize SAN and NAS arrays, enabling a more efficient operational model that, in at least some embodiments, is optimized for virtualized environments and is centered on the application instead of the infrastructure.

Generally, virtual volumes (also referred to herein as vVols) are encapsulations of VM files, virtual disks, and their derivatives. On a storage system, virtual volumes can reside in virtual volume datastores, which are also referred to as storage containers. Virtual volume datastores are a type of datastore which allows virtual volumes to map directly to a storage system at a more granular level than VM filesystem (VMFS) and Network File System (NFS) datastores. While VMFS and NFS datastores are managed and provisioned at the LUN or filesystem level, virtual volumes allow VMs or virtual disks to be managed independently. An end-user, for example, can create a virtual volume datastore based on underlying storage pools and allocate a specific portion of one or more storage pools to be used for the virtual volume datastore and its virtual volumes. A hypervisor may use NAS and SCSI Protocol Endpoints (PEs) as access points for I/O communication between VMs and their virtual volume datastores on a storage system.

Accordingly, virtual volumes can be stored natively inside a storage system that is connected to one or more hosts through Ethernet or SAN. In some embodiments, the virtual volumes are exported as objects by a compliant storage system and are managed entirely by hardware on the storage side. Typically, a globally unique identifier (GUID) identifies a virtual volume. Virtual volumes are not preprovisioned, in at least some embodiments, but created automatically when VM management operations are performed. These operations can include, for example, a VM creation, cloning, and snapshotting. One or more virtual volumes can be associated with a VM.

Figure 2A:
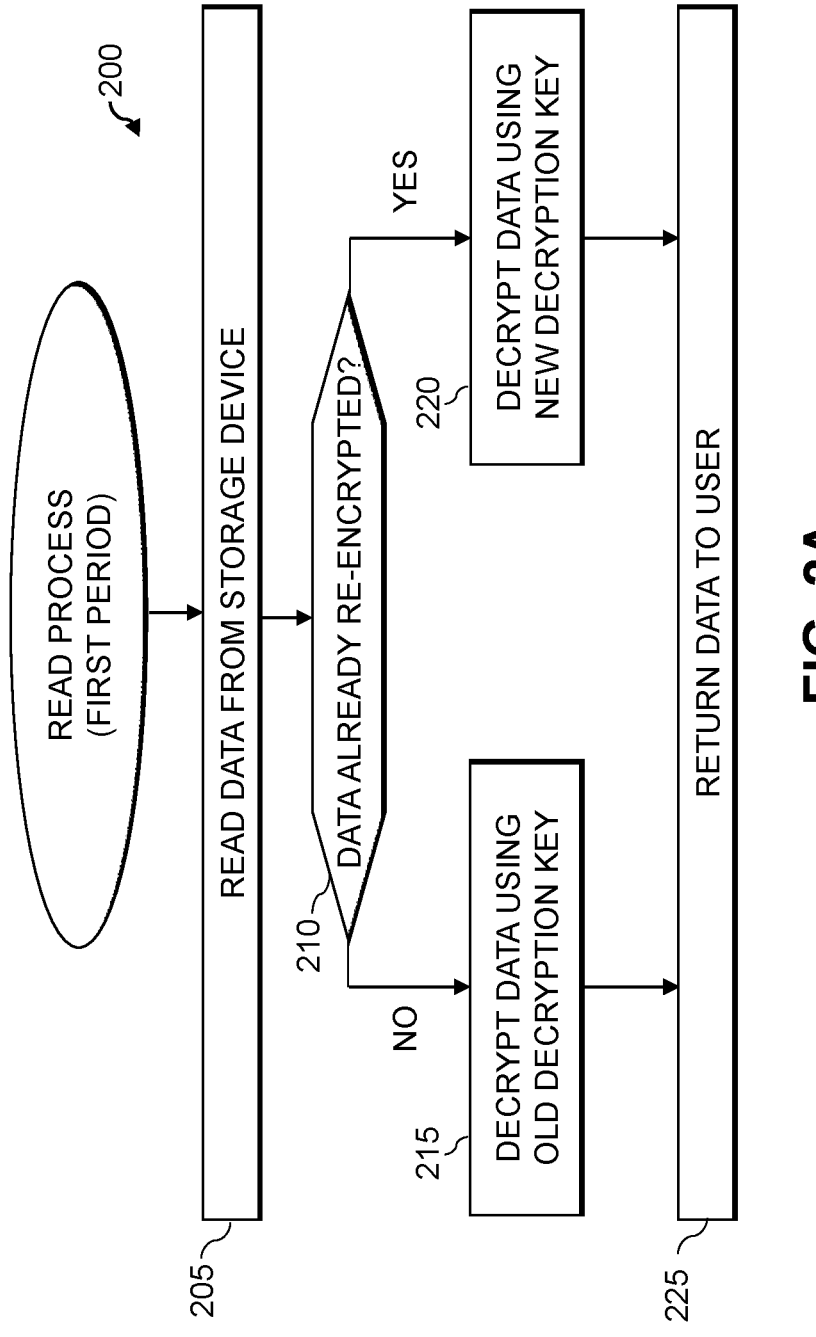
FIGS. 2A and 2B are flow diagrams illustrating exemplary implementations of a read process and a write process, respectively, for a first time period in illustrative embodiments.
Figure 2B:
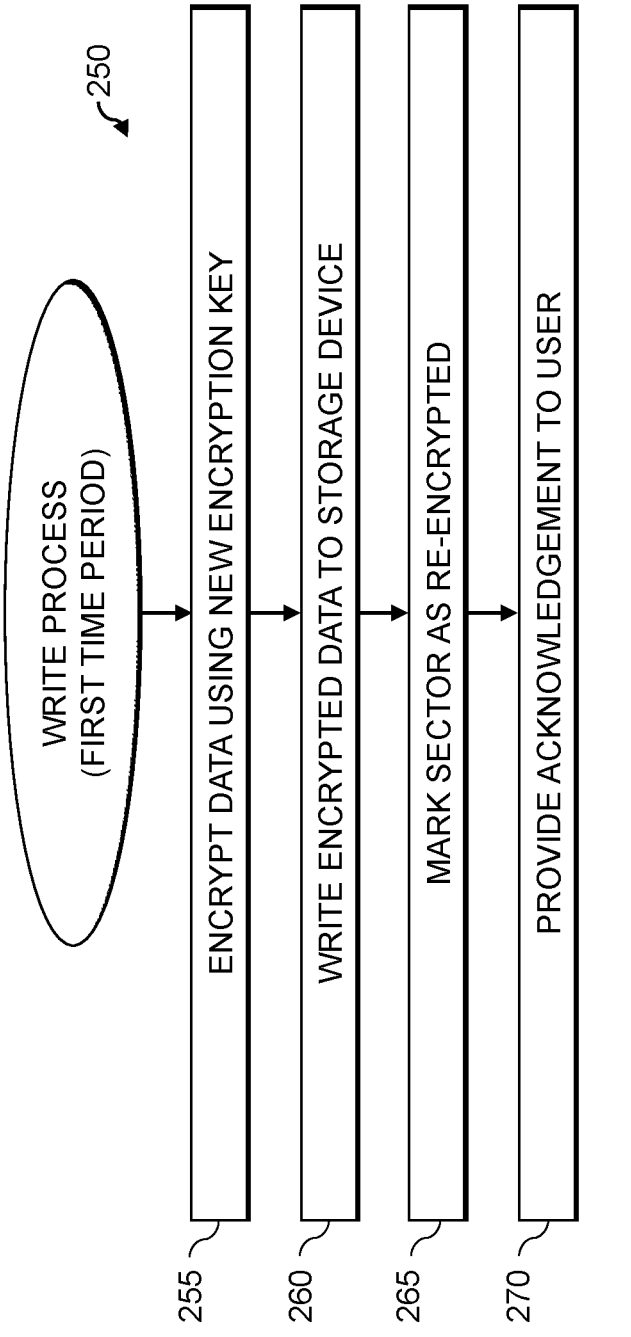

FIGS. 2A and 2B are flow diagrams illustrating exemplary implementations of a read process 200 and a write process 250, respectively, for a first time period in illustrative embodiments. As noted above, the first time period (e.g., a "green time period") may represent a time window when there is little or no pressure to complete the "re-encryption" process. During the first time period, the storage device leverages existing write requests and commits them with new encryption keys (introducing little or no latency impact or excessive I/O to the storage device). The storage device reads data using its regular process using the relevant encryption key (introducing little or no latency impact). No additional (active) re-encryption steps need to take place during the first time period.

In the example of FIG. 2A, the read process 200 processes a request to read data from a storage device in step 205. A test is performed in step 210 to determine if the requested data is already re-encrypted. If it is determined in step 210 that the requested data is not already re-encrypted, then the data is decrypted in step 215 using the old decryption key. If, however, it is determined in step 210 that the requested data is already re-encrypted, then the data is decrypted in step 220 using the new decryption key. The data is returned in step 225 to the user (e.g., the sender of the read request).

In the example of FIG. 2B, the write process 250 processes a user request to write data to a storage device and encrypts the data using a new encryption key in step 255. In some embodiments, only blocks marked as "used" blocks in a used/unused block bitmap (e.g., provided by an SSD vendor) are encrypted in step 255 to conserve compute resources and unnecessary drive wear. The used/unused block bitmap marks a given block as "used" then the given block is written into, and a particular block is marked as "unused" when a TRIM command that refers to the particular block is sent (e.g., once a block is no longer used it should not be re-encrypted).

The encrypted data is written to the storage device in step 260. The sector is marked as re-encrypted in step 265 and an acknowledgement is provided to the user in step 270.

By the end of the first time period, all active (write) disk sectors should be re-encrypted. In the event that all storage drive sectors were already re-encrypted, the encryption technique rotation operation completes.

Figure 3A:
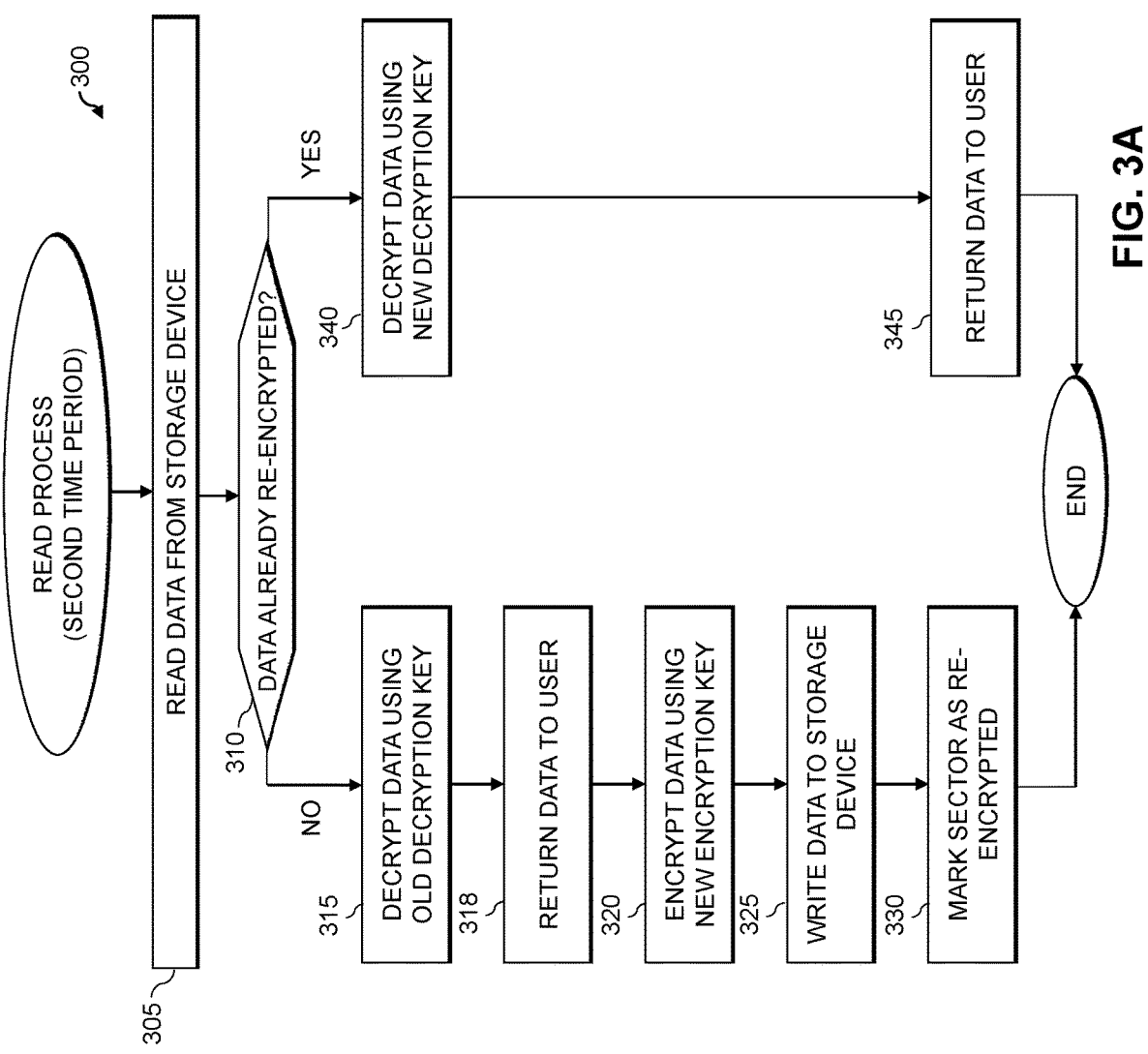
FIGS. 3A and 3B are flow diagrams illustrating exemplary implementations of a read process and a write process, respectively, for a second time period in illustrative embodiments.
Figure 3B:
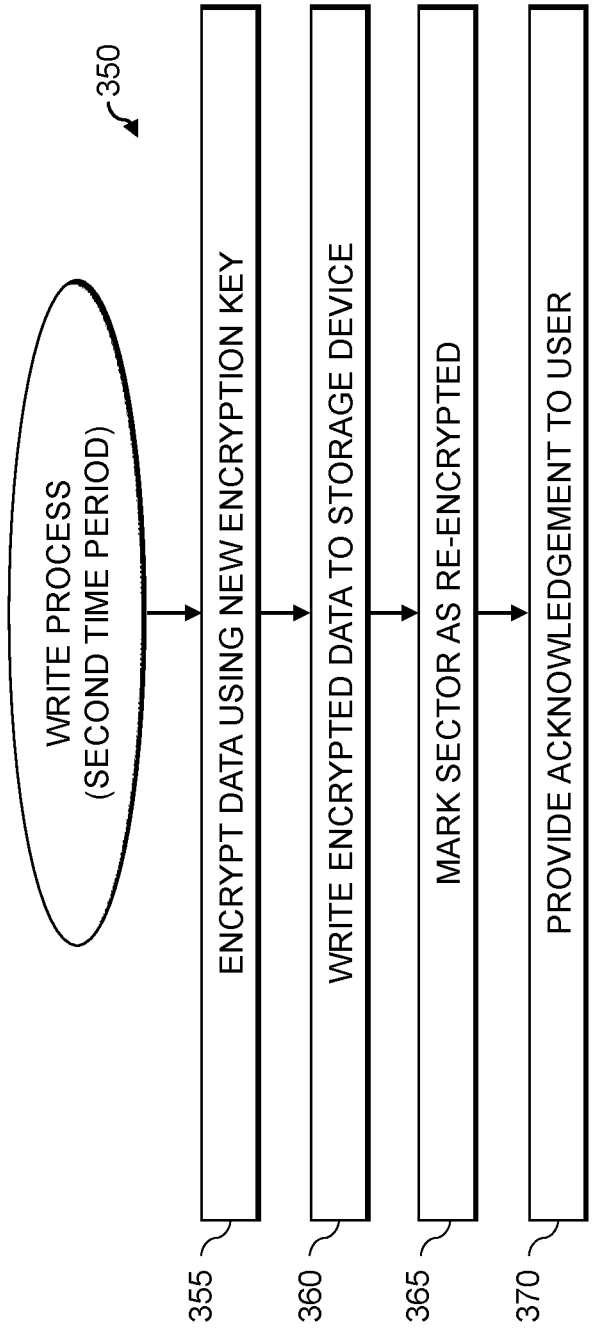

FIGS. 3A and 3B are flow diagrams illustrating exemplary implementations of a read process 300 and a write process 350, respectively, for a second time period in illustrative embodiments. As noted above, the second time period (e.g., a "yellow time period") represents a time window when the chances of a new write request over a non-re-encrypted sector are low; however, there is some pressure to complete the "re-encryption" process. During the second time period, the storage device also leverages existing read requests (in addition to the write requests) of non-re-encrypted data sectors and re-encrypts the data associated with the read requests with new encryption keys. This operation introduces a substantially lower latency impact (than a read-modify-write operation) as the user is already reading the sector. No additional (active) re-encryption steps need to take place during the second time period.

In the example of FIG. 3A, the read process 300 processes a request to read data from a storage device in step 305. A test is performed in step 310 to determine if the requested data is already re-encrypted. If it is determined in step 310 that the requested data is not already re-encrypted, then the data is decrypted in step 315 using the old decryption key and the decrypted data is returned to the user in step 318. In step 320, the decrypted data is encrypted using the new encryption key. The encrypted data is then written to the storage device in step 325 and the sector is marked as re-encrypted in step 330.

If, however, it is determined in step 310 that the requested data is already re-encrypted, then the data is decrypted in step 340 using the new decryption key. The decrypted data is returned to the user in step 345.

In the example of FIG. 3B, the write process 350 processes a user request to write data to a storage device and encrypts the data using a new encryption key in step 355. In some embodiments, only blocks marked as "used" blocks in a used/unused block bitmap (e.g., provided by an SSD vendor) are encrypted in step 355 to conserve compute resources and unnecessary drive wear, as discussed above. The encrypted data is written to the storage device in step 360. The sector is marked as re-encrypted in step 365 and an acknowledgement is provided in step 370 to the user (e.g., the sender of the write request).

By the end of the second time period, all active disk sectors should be re-encrypted. In the event that all storage drive sectors were already re-encrypted, the encryption technique rotation operation completes.

Figure 4A:
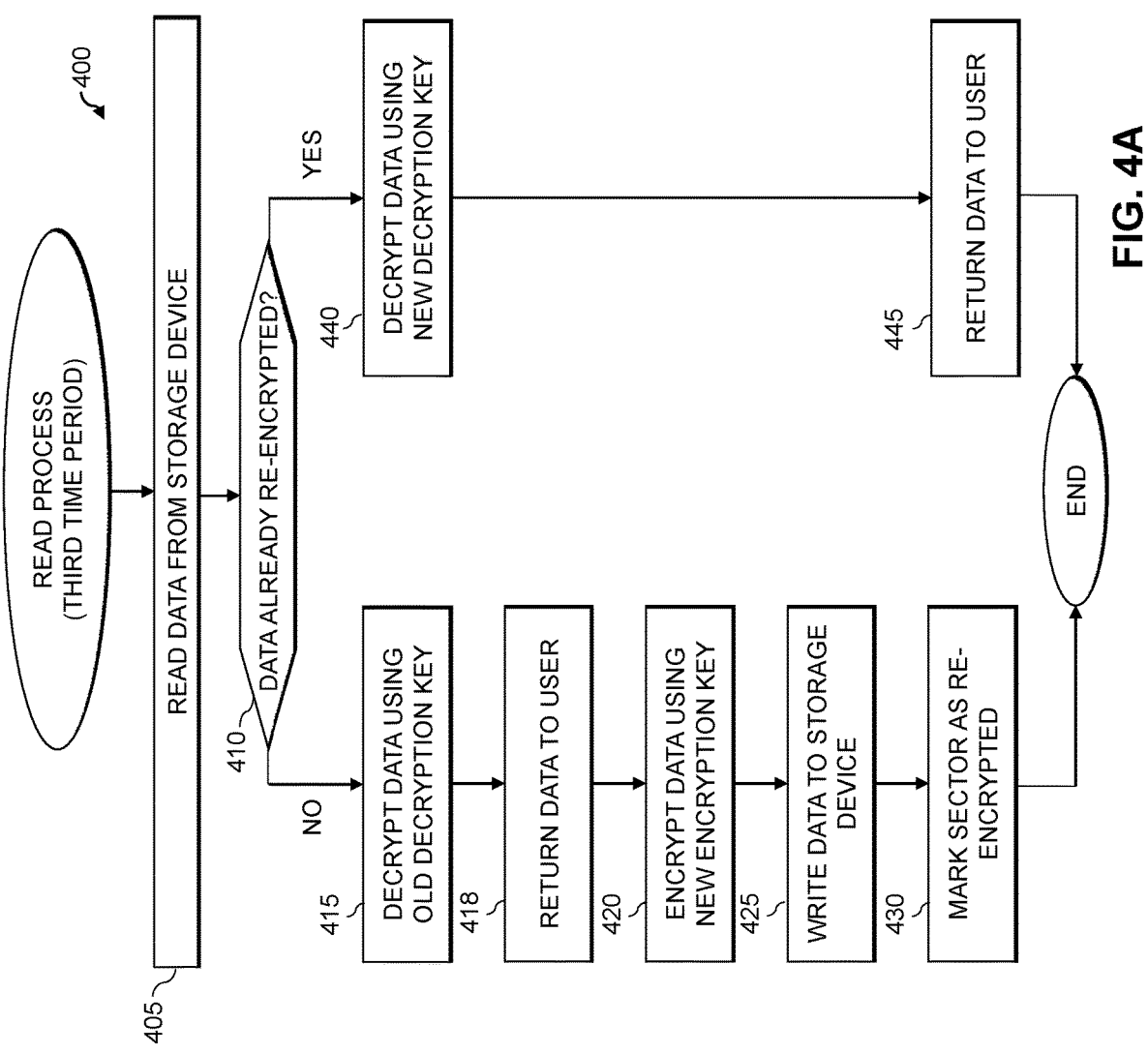
FIGS. 4A, 4B and 4C are flow diagrams illustrating exemplary implementations of a read process, a write process and a system process, respectively, for a third time period in illustrative embodiments.
Figure 4B:
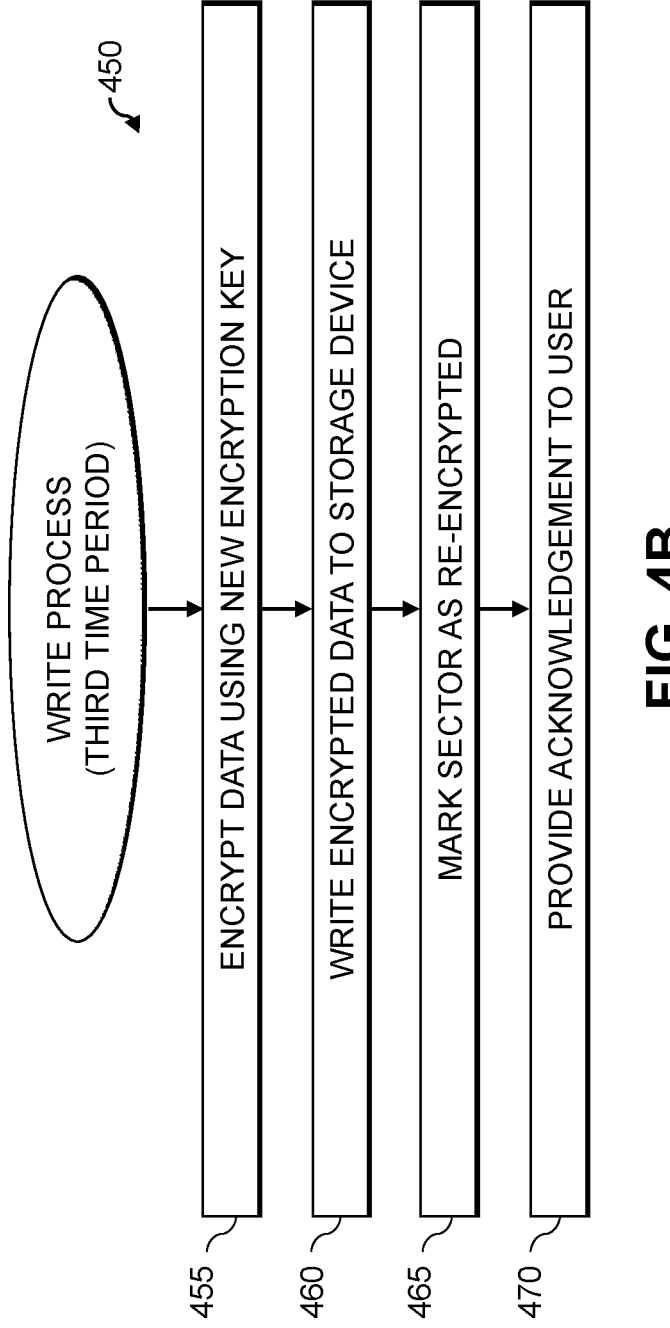
Figure 4C:
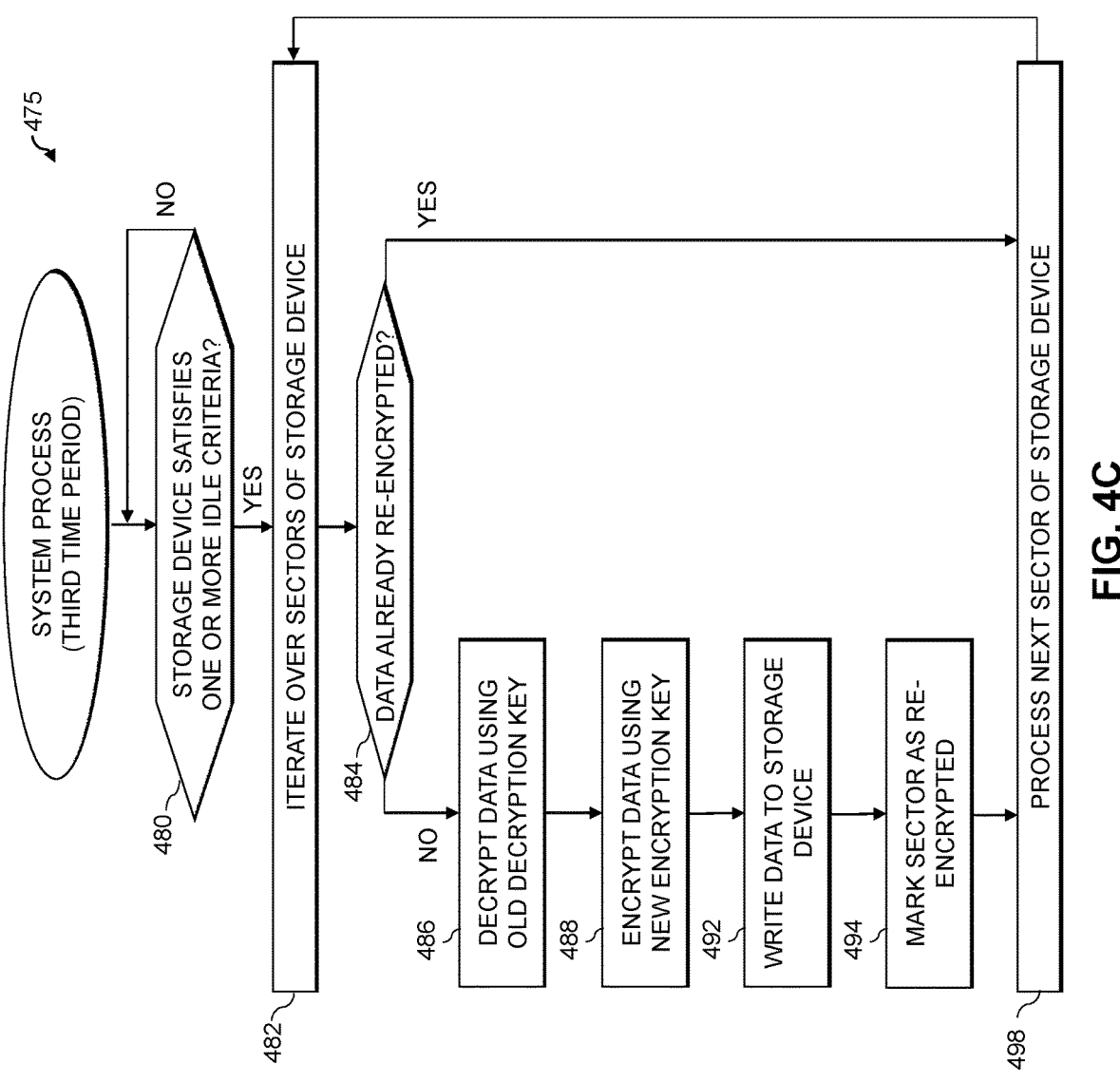

FIGS. 4A, 4B and 4C are flow diagrams illustrating exemplary implementations of a read process 400, a write process 450 and a system process 475, respectively, for a third time period in illustrative embodiments. As noted above, the third time period (e.g., a "red time period") represents a time window when all active data sectors have already been re-encrypted and there is a need to handle the non-re-encrypted data sectors to adhere to the re-encryption requirements. During the third time period, the storage device also actively re-encrypts all non-re-encrypted sectors (in addition to leveraging existing write requests and read requests) with new encryption keys.

In the example of FIG. 4A, the read process 400 processes a request to read data from a storage device in step 405. A test is performed in step 410 to determine if the requested data is already re-encrypted. If it is determined in step 410 that the requested data is not already re-encrypted, then the data is decrypted in step 415 using the old decryption key and the decrypted data is returned to the user (e.g., the sender of the read request) in step 418. In step 420, the decrypted data is encrypted using the new encryption key. The encrypted data is then written to the storage device in step 425 and the sector is marked as re-encrypted in step 430.

If, however, it is determined in step 410 that the requested data is already re-encrypted, then the data is decrypted in step 440 using the new decryption key. The decrypted data is returned to the user in step 445.

In the example of FIG. 4B, the write process 450 processes a user request to write data to a storage device and encrypts the write data using a new encryption key in step 455. In some embodiments, only blocks marked as "used" blocks in a used/unused block bitmap (e.g., provided by an SSD vendor) are encrypted in step 455 to conserve compute resources and unnecessary drive wear, as discussed above. The encrypted data is written to the storage device in step 460. The sector is marked as re-encrypted in step 465 and an acknowledgement is provided in step 470 to the user (e.g., the sender of the write request).

In the example of FIG. 4C, all non-re-encrypted sectors are actively re-encrypted. An optional test is performed in step 480 to determine if the storage device satisfies one or more idle criteria (e.g., indicating the re-encryption will affect the user experience). If it is determined in step 480 that the storage device does not satisfy the one or more idle criteria, then program control returns to step 480 to wait until the one or more idle criteria are satisfied.

If it is determined in step 480 that the storage device does satisfy the one or more idle criteria, then the system process 475 iterates over sectors of the storage device in step 482. A test is performed in step 484 to determine if the data of the current sector is already re-encrypted. If it is determined in step 484 that the data of the current sector is not already re-encrypted, then the data of the current sector is decrypted in step 486 using the old decryption key. In step 488, the decrypted data is encrypted using the new encryption key. The encrypted data is then written to the storage device in step 492 and the sector is marked as re-encrypted in step 494 and program control proceeds to step 498.

If, however, it is determined in step 484 that the data of the current sector is already re-encrypted, then program control proceeds directly to step 498.

The next sector of the storage device, if any, is processed in step 498 by returning to step 482.

By the end of the third time period, all active disk sectors are re-encrypted and the encryption technique rotation operation completes and then restarts.

One or more aspects of the disclosure recognize that when re-encrypting storage devices with a low change ratio (e.g., when the storage devices rarely written to) most of the re-encryption may be delayed until the third time period and the re-encryption will be primarily performed by the system process 475 of FIG. 4C. In some embodiments, when a storage device is in the first time period, but is currently idle, the system process 475 of FIG. 4C may be performed to proactively re-encrypt data sectors. In this manner, the re-encryption process can progress without degrading the performance of the front-end I/O (as the storage device is idle anyway).

Figure 5:
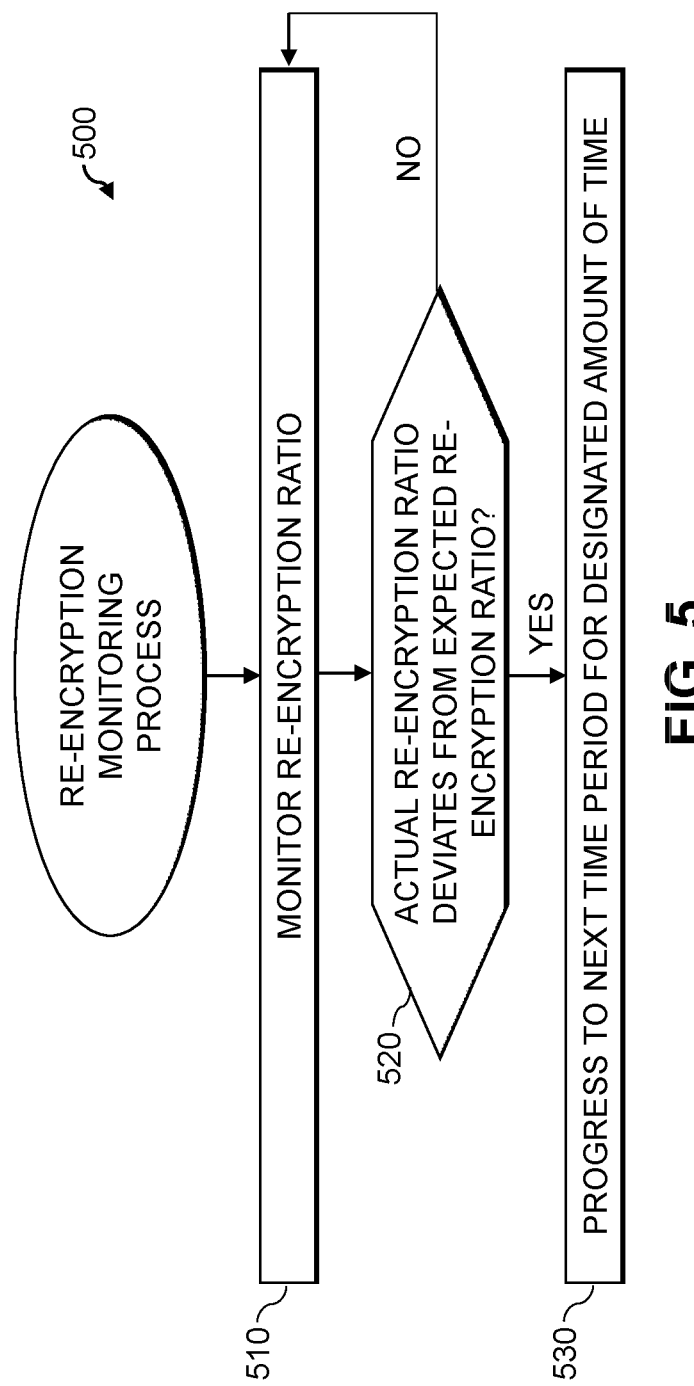
FIG. 5 is a flow diagram illustrating an exemplary implementation of a re-encryption monitoring process in an illustrative embodiment.

FIG. 5 is a flow diagram illustrating an exemplary implementation of a re-encryption monitoring process 500 in an illustrative embodiment. In some embodiments, the re-encryption monitoring process 500 determines a re-encryption ratio and compares the re-encryption ratio to an expected re-encryption ratio over time. Generally, if the re-encryption process falls behind schedule (e.g., when the current re-encryption ratio is significantly behind the expected re-encryption ratio), the storage device will temporarily progress to the next time period. For example, if the storage device is currently in a first time period, the storage device will progress to the second time period (where the storage device also leverages existing read requests (in addition to the write requests) of non-re-encrypted data sectors and re-encrypts the data associated with the read requests with new encryption keys). Likewise, if the storage device is in the second time period, the storage device will progress to the third time period.

In the example of FIG. 5, the re-encryption monitoring process 500 monitors the re-encryption ratio during step 510. A test is performed in step 520 to determine if the current (monitored) re-encryption ratio deviates from an expected re-encryption ratio. In some embodiments, the re-encryption monitoring process 500 can return to the normal time period once the expected re-encryption ratio has been reached. In this manner, the re-encryption monitoring process 500 of FIG. 5 progresses between the first time period, the second time period and the third time period based on a progress of the re-encryption. An encryption policy may specify, for example, that the expected re-encryption ratio for each day of a cryptoperiod may be determined by dividing 100% by the number of days in the cryptoperiod to obtain the expected re-encryption ratio per day.

If it is determined in step 520 that the current re-encryption ratio does not deviate from the expected re-encryption ratio, then program control returns to step 510 to continue monitoring the re-encryption ratio. If, however, it is determined in step 520 that the current re-encryption ratio does deviate from the expected re-encryption ratio, then the re-encryption monitoring process 500 progresses the storage device in step 530 to a next time period for a designated amount of time. For example, if the storage device is currently in a first time period, the storage device will progress to the second time period, and if the storage device is currently in the second time period, the storage device will progress to the third time period.

In this manner, the re-encryption monitoring process 500 can ensure that the re-encryption process does not fall behind an expected pace.

FIG. 6 is a flow diagram illustrating an exemplary implementation of a process 600 for encryption technique rotation using I/O operations in an illustrative embodiment. In the example of FIG. 6, the process 600 obtains at least one I/O request from a user to write designated data (e.g., the designated data is the data associated with the at least one I/O request that is being requested to be written) to at least one storage device in step 602, wherein at least a portion of existing data stored by the at least one storage device prior to the obtaining the at least one I/O request to write the designated data is protected using a first encryption technique associated with a first time period.

In step 604, the designated data is protected using a second encryption technique associated with a second time period, wherein the second time period is subsequent to the first time period and the second encryption technique is different than the first encryption technique. The protected designated data is written to at least one sector of the at least one storage device in step 606. The at least one sector may be marked as comprising re-encrypted data. An acknowledgement may be provided to at least one user in response to a completion of the at least one I/O request to write the designated data. The first encryption technique associated with the first time period may employ a first encryption key and/or a first encryption algorithm and the second encryption technique associated with the second time period may employ a second encryption key and/or a second encryption algorithm.

In some embodiments, at least one I/O request to read data is obtained, and a determination is made as to whether the requested data is stored in at least one sector comprising re-encrypted data. The requested data is decrypted using a decryption key obtained based at least in part on a result of the determining. The steps of FIG. 6 may be performed in response to an occurrence of at least one of a first encryption key, associated with the first encryption technique, being compromised; the first encryption key satisfying one or more designated expiration criteria; and/or an amount of data encrypted using the first encryption key satisfying one or more designated encryption limit criteria.

In one or more embodiments, in response to an occurrence of one or more designated events, the following steps are performed (e.g., for at least one portion of a designated key duration): obtaining at least one I/O request to read data; determining if the requested data is stored in at least one sector comprising re-encrypted data; and in response to determining that the requested data, is not stored in at least one sector comprising re-encrypted data, the following steps are performed: decrypting the requested data using a first decryption key associated with the first encryption technique; encrypting the data using a second encryption key associated with the second encryption technique; writing the encrypted data to at least one sector of the at least one storage device; and marking the at least one sector as comprising re-encrypted data.

In at least one embodiment, in response to an occurrence of one or more designated events, the following steps are performed (e.g., when the at least one storage device satisfies one or more designated idle criteria): determining if at least one sector of the at least one storage device comprises re-encrypted data; and in response to determining that the at least one sector of the at least one storage device does not comprise re-encrypted data, the following steps are performed: decrypting the requested data using a first decryption key associated with the first encryption technique; encrypting the data using a second encryption key associated with the second encryption technique; writing the encrypted data to at least one sector of the at least one storage device; and marking the at least one sector as comprising re-encrypted data.

In an embodiment, a re-encryption ratio of the at least one storage device is monitored; and in response to a deviation of a measured re-encryption ratio from an expected re-encryption ratio, performing one or more of: (a) obtaining at least one I/O request to read data; determining if the requested data is stored in at least one sector comprising re-encrypted data; and in response to determining that the requested data is not stored in at least one sector comprising re-encrypted data: decrypting the requested data using a first decryption key associated with the first encryption technique; encrypting the data using a second encryption key associated with the second encryption technique; writing the encrypted data to at least one sector of the at least one storage device; and marking the at least one sector as comprising re-encrypted data; and (b) determining if at least one sector of the at least one storage device comprises re-encrypted data; and in response to determining that the at least one sector of the at least one storage device, does not comprise re-encrypted data: decrypting the requested data using a first decryption key associated with the first encryption technique; encrypting the data using a second encryption key associated with the second encryption technique; writing the encrypted data to at least one sector of the at least one storage device; and marking the at least one sector as comprising re-encrypted data.

The particular processing operations and other network functionality described in conjunction with FIGS. 2A, 2B, 3A, 3B, 4A, 4B, 4C, 5 and 6, for example, are presented by way of illustrative example only, and should not be construed as limiting the scope of the disclosure in any way. Alternative embodiments can use other types of processing operations to provide functionality for encryption technique rotation using I/O operations. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

Illustrative embodiments of processing platforms utilized to implement functionality for encryption technique rotation using I/O operations will now be described in greater detail with reference to FIGS. 7 and 8. Although described in the context of information processing system 100, these platforms may also be used to implement at least portions of other information processing systems in other embodiments.

Figure 7:
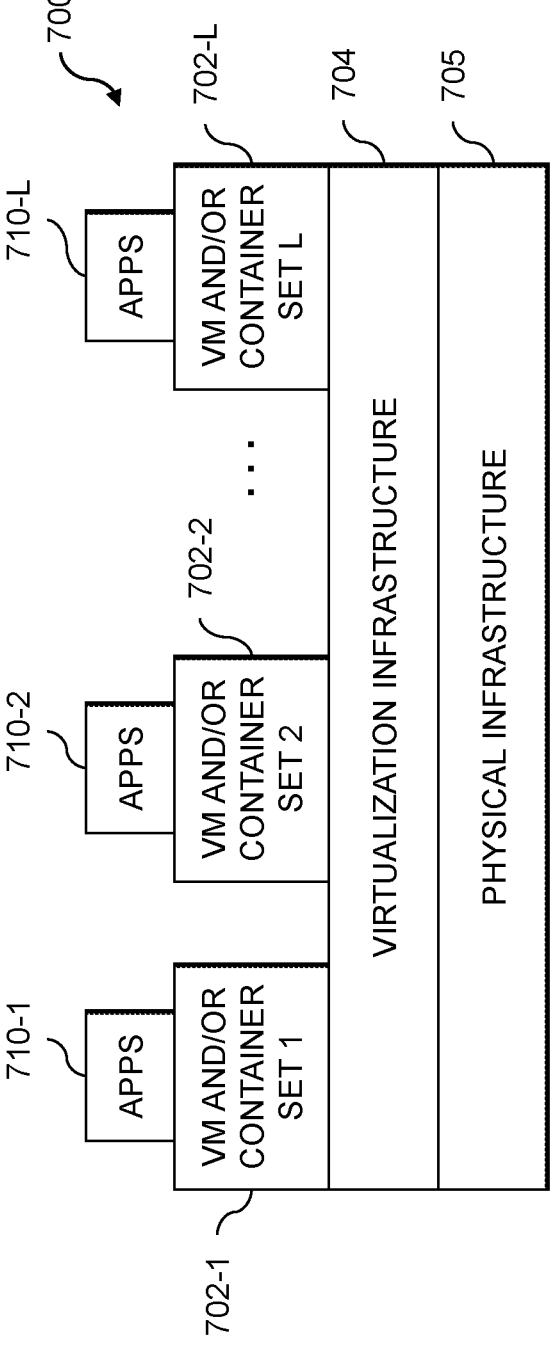
FIGS. 7 and 8 show examples of processing platforms that may be utilized to implement at least a portion of an information processing system in illustrative embodiments.
Figure 8:
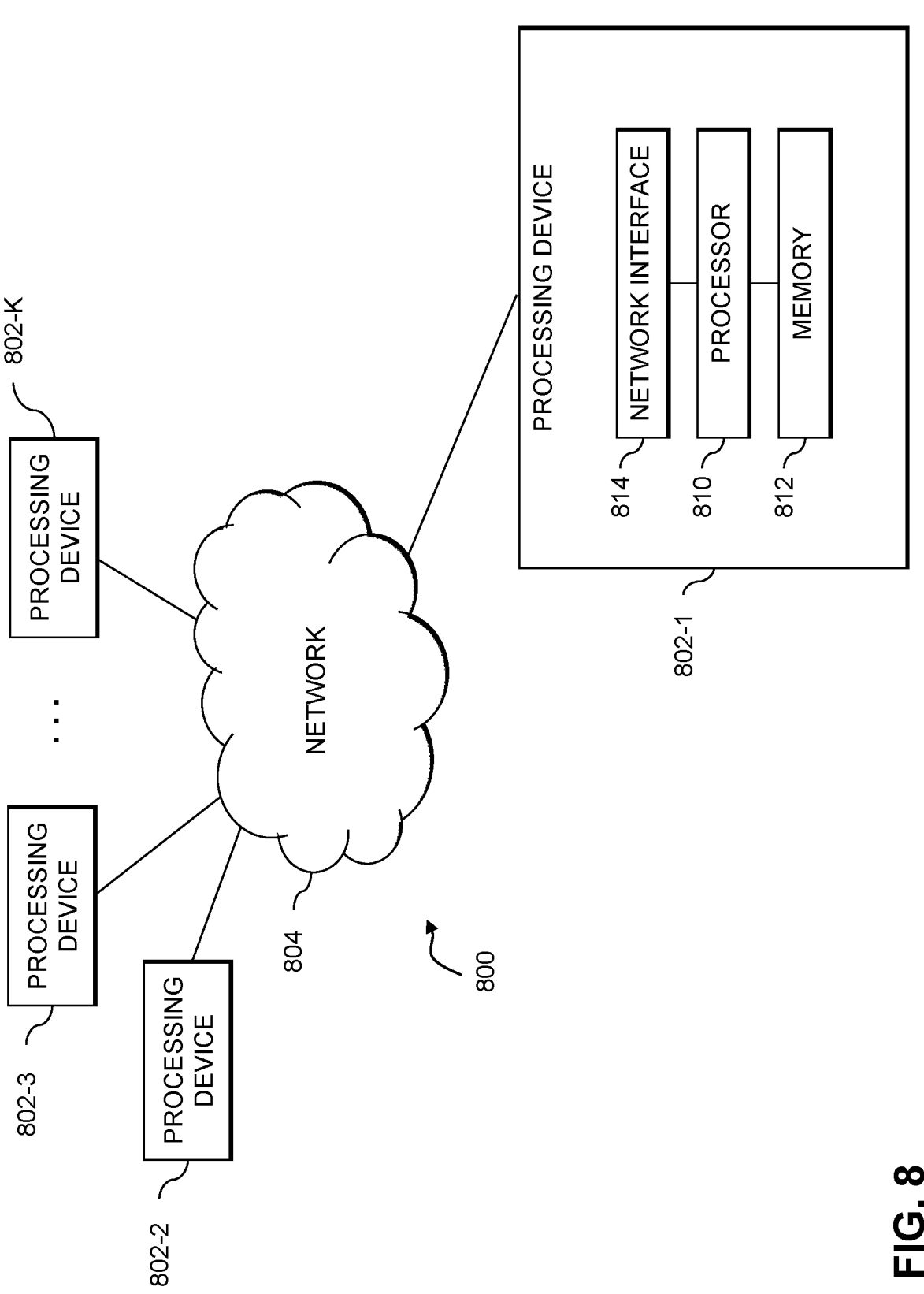

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple VMs and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of information processing system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and processing platform 800 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for encryption technique rotation using I/O operations as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining at least one input/output (I/O) request from a user to write designated data to at least one storage device, wherein at least a portion of existing data stored by the at least one storage device prior to the obtaining the at least one I/O request to write the designated data is protected using a first encryption technique associated with a first time period, wherein the first time period occurred prior to the obtaining;

protecting the designated data using a second encryption technique associated with a second time period, wherein the second time period is subsequent to the first time period and the second encryption technique is different than the first encryption technique, wherein the second time period comprises at least a first portion and a distinct second portion, wherein the first portion employs one or more user write operations to encrypt data using the second encryption technique and wherein the second portion employs one or more user write operations and one or more user read operations to encrypt data using the second encryption technique; and writing the protected designated data to at least one sector of the at least one storage device;

wherein the method is performed by at least one processing device comprising a processor coupled to a memory.

2. The method of claim 1, further comprising marking the at least one sector as comprising re-encrypted data.

3. The method of claim 1, further comprising:

obtaining at least one I/O request to read data;

determining if the requested read data is stored in at least one sector comprising re-encrypted data; and decrypting the requested read data using a decryption key obtained based at least in part on a result of the determining.

4. The method of claim 1, comprising, in response to an occurrence of one or more designated events:

obtaining at least one I/O request to read data;

determining if the requested read data is stored in at least one sector comprising re-encrypted data; and in response to determining that the requested read data is not stored in at least one sector comprising re-encrypted data:

decrypting the requested read data using a first decryption key associated with the first encryption technique to generate decrypted data;

encrypting the decrypted data using a second encryption key associated with the second encryption technique to generate encrypted data; and writing the encrypted data to at least one sector of the at least one storage device.

5. The method of claim 4, wherein the steps performed in response to the occurrence of the one or more designated events are performed for at least one portion of a designated key duration.

6. The method of claim 1, wherein the method is performed in response to an occurrence of at least one of:

a first encryption key, associated with the first encryption technique, being compromised;

the first encryption key satisfying one or more designated expiration criteria; and an amount of data encrypted using the first encryption key satisfying one or more designated encryption limit criteria.

7. The method of claim 1, further comprising providing an acknowledgement to at least one user in response to a completion of the at least one I/O request to write the designated data.

8. The method of claim 1, comprising, in response to an occurrence of one or more designated events:

determining if at least one sector of the at least one storage device comprises re-encrypted data; and in response to determining that the at least one sector of the at least one storage device does not comprise re-encrypted data:

decrypting data stored in the at least one sector of the at least one storage device using a first decryption key associated with the first encryption technique to generate decrypted data;

encrypting the decrypted data using a second encryption key associated with the second encryption technique to generate encrypted data; and writing the encrypted data to the at least one sector of the at least one storage device.

9. The method of claim 8, wherein the one or more designated events comprise determining that the at least one storage device satisfies one or more designated idle criteria.

10. The method of claim 1, wherein the first encryption technique associated with the first time period employs one or more of a first encryption key and a first encryption algorithm and wherein the second encryption technique associated with the second time period employs one or more of a second encryption key and a second encryption algorithm.

11. The method of claim 1, further comprising:

monitoring a re-encryption ratio of the at least one storage device; and in response to identifying a deviation of a measured re-encryption ratio from an expected re-encryption ratio, performing one or more of:

(a) obtaining at least one I/O request to read data; determining if the requested read data is stored in at least one sector comprising re-encrypted data; and in response to determining that the requested read data is not stored in at least one sector comprising re-encrypted data: decrypting the requested read data using a first decryption key associated with the first encryption technique to generate decrypted data; encrypting the decrypted data using a second encryption key associated with the second encryption technique to generate encrypted data; and writing the encrypted data to at least one sector of the at least one storage device; and (b) determining if at least one sector of the at least one storage device comprises re-encrypted data; and in response to determining that the at least one sector of the at least one storage device does not comprise re-encrypted data: decrypting the data stored in the at least one sector of the at least one storage device using a first decryption key associated with the first encryption technique to generate decrypted data; encrypting the decrypted data using a second encryption key associated with the second encryption technique to generate encrypted data; and writing the encrypted data to the at least one sector of the at least one storage device.

12. An apparatus comprising:

at least one processing device comprising a processor coupled to a memory;

the at least one processing device being configured to implement the following steps:

obtaining at least one input/output (I/O) request from a user to write designated data to at least one storage device, wherein at least a portion of existing data stored by the at least one storage device prior to the obtaining the at least one I/O request to write the designated data is protected using a first encryption technique associated with a first time period, wherein the first time period occurred prior to the obtaining;

protecting the designated data using a second encryption technique associated with a second time period, wherein the second time period is subsequent to the first time period and the second encryption technique is different than the first encryption technique, wherein the second time period comprises at least a first portion and a distinct second portion, wherein the first portion employs one or more user write operations to encrypt data using the second encryption technique and wherein the second portion employs one or more user write operations and one or more user read operations to encrypt data using the second encryption technique; and writing the protected designated data to at least one sector of the at least one storage device.

13. The apparatus of claim 12, further comprising:

obtaining at least one I/O request to read data;

determining if the requested read data is stored in at least one sector comprising re-encrypted data; and decrypting the requested read data using a decryption key obtained based at least in part on a result of the determining.

14. The apparatus of claim 12, comprising, in response to an occurrence of one or more designated events:

obtaining at least one I/O request to read data;

determining if the requested read data is stored in at least one sector comprising re-encrypted data; and in response to determining that the requested read data is not stored in at least one sector comprising re-encrypted data:

decrypting the requested read data using a first decryption key associated with the first encryption technique to generate decrypted data;

encrypting the decrypted data using a second encryption key associated with the second encryption technique to generate encrypted data; and writing the encrypted data to at least one sector of the at least one storage device.

15. The apparatus of claim 12, comprising, in response to an occurrence of one or more designated events:

determining if at least one sector of the at least one storage device comprises re-encrypted data; and in response to determining that the at least one sector of the at least one storage device does not comprise re-encrypted data:

decrypting data stored in the at least one sector of the at least one storage device using a first decryption key associated with the first encryption technique to generate decrypted data;

encrypting the decrypted data using a second encryption key associated with the second encryption technique to generate encrypted data; and writing the encrypted data to the at least one sector of the at least one storage device.

16. The apparatus of claim 12, wherein the first encryption technique associated with the first time period employs one or more of a first encryption key and a first encryption algorithm and wherein the second encryption technique associated with the second time period employs one or more of a second encryption key and a second encryption algorithm.

17. A non-transitory processor-readable storage medium having stored therein program code of one or more software programs, wherein the program code when executed by at least one processing device causes the at least one processing device to perform the following steps:

obtaining at least one input/output (I/O) request from a user to write designated data to at least one storage device, wherein at least a portion of existing data stored by the at least one storage device prior to the obtaining the at least one I/O request to write the designated data is protected using a first encryption technique associated with a first time period, wherein the first time period occurred prior to the obtaining;

protecting the designated data using a second encryption technique associated with a second time period, wherein the second time period is subsequent to the first time period and the second encryption technique is different than the first encryption technique, wherein the second time period comprises at least a first portion and a distinct second portion, wherein the first portion employs one or more user write operations to encrypt data using the second encryption technique and wherein the second portion employs one or more user write operations and one or more user read operations to encrypt data using the second encryption technique; and writing the protected designated data to at least one sector of the at least one storage device.

18. The non-transitory processor-readable storage medium of claim 17, further comprising:

obtaining at least one I/O request to read data;

determining if the requested read data is stored in at least one sector comprising re-encrypted data; and decrypting the requested read data using a decryption key obtained based at least in part on a result of the determining.

19. The non-transitory processor-readable storage medium of claim 17, comprising, in response to an occurrence of one or more designated events:

obtaining at least one I/O request to read data;

determining if the requested read data is stored in at least one sector comprising re-encrypted data; and in response to determining that the requested read data is not stored in at least one sector comprising re-encrypted data:

decrypting the requested read data using a first decryption key associated with the first encryption technique to generate decrypted data;

encrypting the decrypted data using a second encryption key associated with the second encryption technique to generate encrypted data; and writing the encrypted data to at least one sector of the at least one storage device.

20. The non-transitory processor-readable storage medium of claim 17, comprising, in response to an occurrence of one or more designated events:

determining if at least one sector of the at least one storage device comprises re-encrypted data; and in response to determining that the at least one sector of the at least one storage device does not comprise re-encrypted data:

decrypting data stored in the at least one sector of the at least one storage device using a first decryption key associated with the first encryption technique to generate decrypted data;

encrypting the decrypted data using a second encryption key associated with the second encryption technique to generate encrypted data; and writing the encrypted data to the at least one sector of the at least one storage device.

* * * * *